(12) United States Patent
Srinivasan et al.

(10) Patent No.: US 11,720,400 B2
(45) Date of Patent: Aug. 8, 2023

(54) PRESCRIPTIVE ANALYTICS-BASED PERFORMANCE-CENTRIC DYNAMIC SERVERLESS SIZING

(71) Applicant: Accenture Global Solutions Limited, Dublin (IE)

(72) Inventors: Madhan Kumar Srinivasan, Bengaluru (IN); Samba Sivachari Rage, Bengaluru (IN); Kishore Kumar Gajula, Telangana (IN)

(73) Assignee: Accenture Global Solutions Limited, Dublin (IE)

( * ) Notice: Subject to any disclaimer, the term of this patent is extended or adjusted under 35 U.S.C. 154(b) by 162 days.

(21) Appl. No.: 17/354,542

(22) Filed: Jun. 22, 2021

(65) Prior Publication Data
US 2022/0405137 A1    Dec. 22, 2022

(51) Int. Cl.
*G06F 9/50* (2006.01)
*G06F 9/54* (2006.01)
*G06N 3/08* (2023.01)

(52) U.S. Cl.
CPC .......... *G06F 9/5005* (2013.01); *G06F 9/544* (2013.01); *G06N 3/08* (2013.01)

(58) Field of Classification Search
CPC .......... G06F 9/5005; G06F 9/544; G06N 3/08
See application file for complete search history.

(56) References Cited

U.S. PATENT DOCUMENTS

| | | | |
|---|---|---|---|
| 10,715,418 B1 | 7/2020 | Cohen et al. | |
| 10,740,306 B1* | 8/2020 | Ivanovic | G06F 16/2219 |
| 2004/0220973 A1* | 11/2004 | Booz | G06F 11/1471 |
| 2014/0279779 A1* | 9/2014 | Zou | G06N 3/049 |
| | | | 706/25 |
| 2017/0006135 A1* | 1/2017 | Siebel | G06F 16/288 |
| 2020/0012934 A1 | 1/2020 | Goodsitt et al. | |
| 2021/0406224 A1* | 12/2021 | Neufeld | G06F 16/1873 |

OTHER PUBLICATIONS

Baldini, Ioana et al., "Serverless Computing: Current Trends and Open Problems", IBM Research, Jun. 10, 2017.
Elgamal, Tarek et al., "Costless: Optimizing Cost of Serverless Computing through Function Fusion and Placement", Department of Computer Science, University of Illinois, Urbana-Champaign, Nov. 23, 2018.
Goldstein, Sam, "AWS Lambda Cost Optimization", Dec. 22, 2017.
Schmutzer, Chad, et al., "Optimizing AWS Lambda cost and performance use AWS Compute Optimizer", AWS Compute Blog, Jun. 16, 2021.

* cited by examiner

*Primary Examiner* — Emerson C Puente
*Assistant Examiner* — Jonathan R Labud
(74) *Attorney, Agent, or Firm* — Crowell & Moring, L.L.P.

(57) ABSTRACT

A multi-layer serverless sizing stack may determine a compute sizing correction for a serverless function. The serverless sizing stack may analyze historical data to determine a base compute allocation and compute buffer range. The serverless sizing stack may traverse the compute buffer range in an iterative analysis to determine a compute size for the serverless function to support efficient computational-operation when the serverless function is instantiated.

20 Claims, 5 Drawing Sheets

PRESCRIPTIVE ANALYTICS-BASED PERFORMANCE-CENTRIC DYNAMIC SERVERLESS SIZING

TECHNICAL FIELD

This disclosure relates to prescriptive analytics-based serverless sizing.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for cloud resource allocation and consumption prediction will further enhance the capabilities of cloud computing systems.

DETAILED DESCRIPTION

In cloud computing systems, compute resources such as serverless functions, memory, or other compute resources may be requisitioned for operation. In some cases, a computing resource may itself constitute an over-provisioning or under provisioning. For example, a serverless function may be initiated with more memory or other compute resources than may be used by the serverless function during execution. In an example, a serverless function may be initiated with less memory or other compute resources than used in the execution of the function leading to low performance, timeouts, and/or other execution issues. Further, the under provisioned serverless function may take longer to execute than a more accurately provisioned serverless function. The consumption of resources to accommodate the extended execution may consume more resources than that saved through the more minimal provisioning. In another illustration, the serverless function, in some cases, may reject or be non-responsive to over-capacity requests. Accordingly, an over-sized or under-sized compute resource may lead to performance degradation or inefficient deployment of hardware resources.

Accordingly, increased compute sizing accuracy, including serverless sizing accuracy, provides a technical solution to the technical problem of system inefficiency by increasing the utilization and efficiency of compute resources. The serverless sizing stack (SSS) techniques and architectures described below may be used to prescribe serverless function sizing recommendations based on computational-performance scores.

The SSS may analyze historical data and consumption metric data to predict future utilization and produce prescriptive recommendations. Utilization data, may include, for example, historical data related to usage or activation of serverless functions, e.g., resource allocation history, function request history data, expenditure report data for serverless compute resources, processor activity, memory usage history, computing cycles, data throughput, or other utilization metrics, seasonal usage cycles e.g., holiday schedules, daily usage cycles, weekly usage cycles, quarterly usage cycles or other data. Historical data may also include utilization data from virtual machine usage for various tasks that may be migrated to a serverless context in the future. Consumption metric data may include computing resource specific cost metrics such as expenditure-per-time or resource-per-time metrics.

Figure 1:
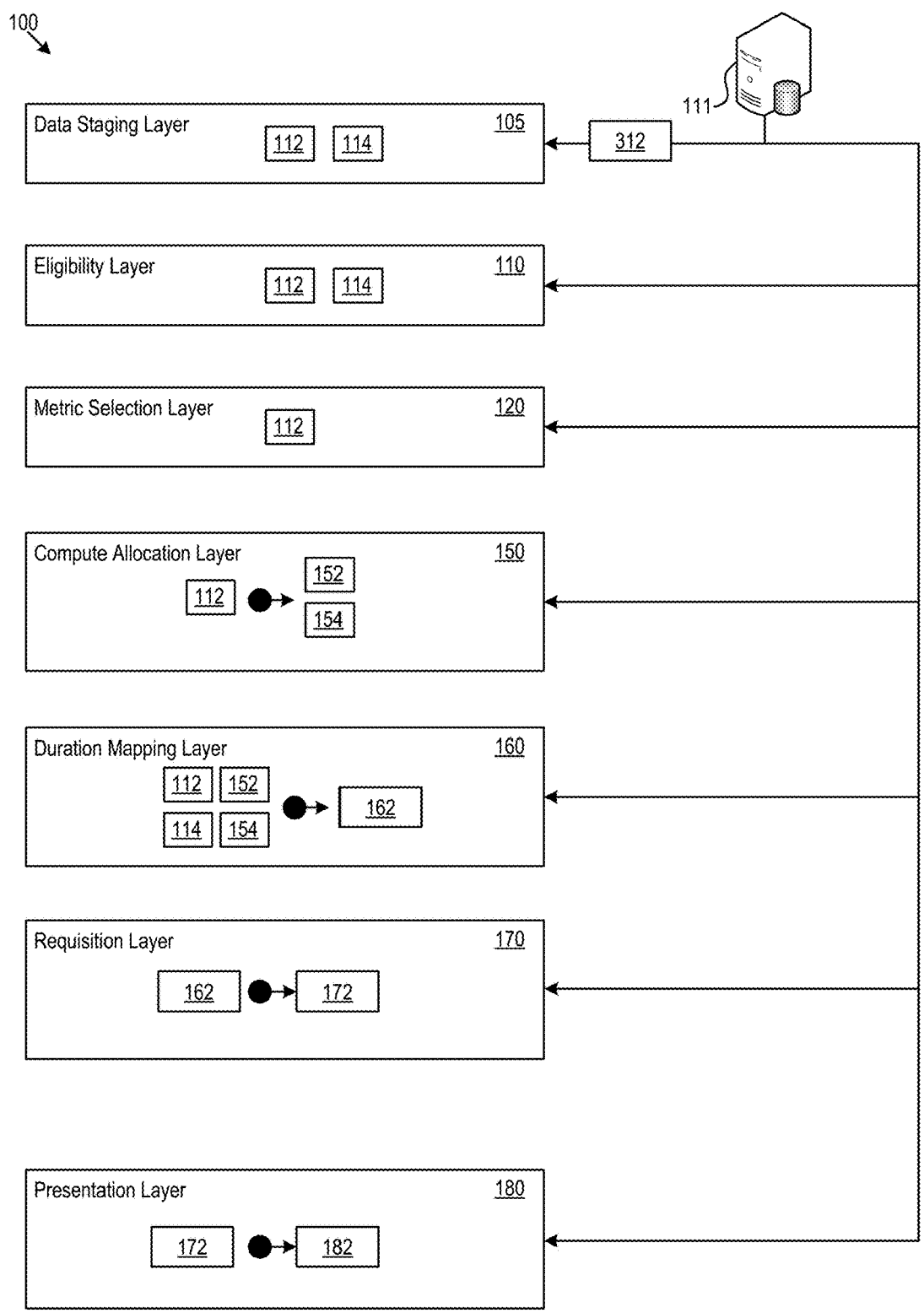
FIG. 1 shows an example serverless sizing stack.

FIG. 1 shows an example multiple layer SSS 100, which may execute on serverless sizing circuitry making up the hardware underpinning of the SSS 100. In this example, the SSS 100 includes a data-staging layer 105, an eligibility layer 110, a metric selection layer 120, a compute allocation layer 150, a duration mapping layer 160, a requisition layer 170, and a presentation layer 180. The SSS 100 may include a multiple-layer computing structure of hardware and/or software that may provide prescriptive analytical recommendations (e.g., directives for allocations of compute resources at the time(s) of serverless function instantiation) through data analysis.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the SSS 100, the data-staging layer 105 may provide the eligibility layer 110 with data-storage resources to access historical data. Hence, the data-staging layer 105 may provide a hardware resource, e.g., memory storage resources, to the eligibility layer 110. Accordingly, the multiple-layer stack architecture of the SSS may improve the functioning of the underlying hardware.

Figure 2:
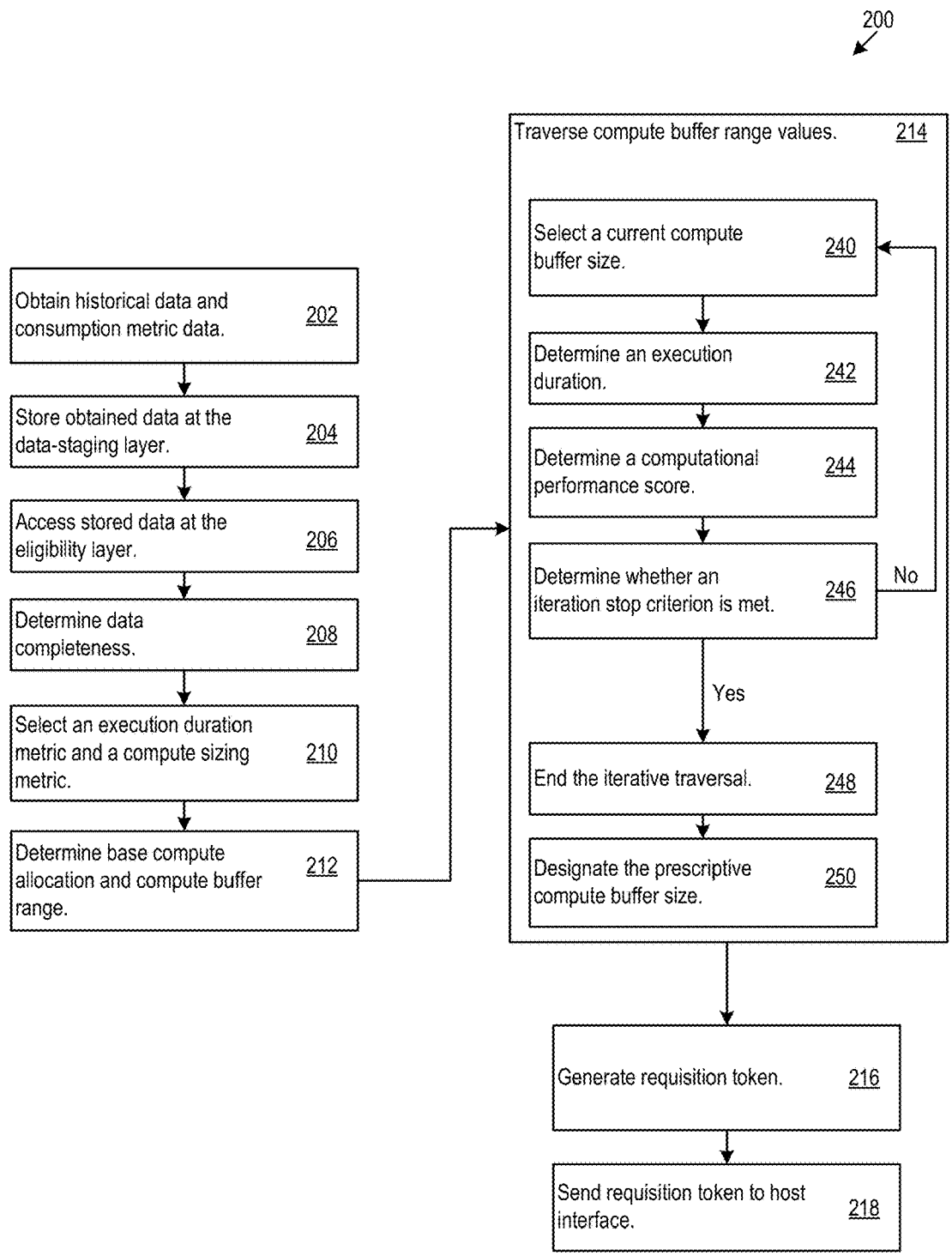
FIG. 2 shows example serverless sizing stack logic.

In the following, reference is made to FIG. 1 and the corresponding example serverless sizing stack logic (SSSL) 200 in FIG. 2. The logical features of SSSL 200 may be implemented in various orders and combinations. For example, in a first implementation, one or more features may be omitted or reordered with respect to a second implementation.

At the data-staging layer 105 of the SSS 100, the SSSL 200 may obtain historical data 112 and/or consumption metric data 114 (202) and then store the obtained data (204). In some cases, the historical data 112 and/or consumption metric data 114 may be received via communication interfaces (e.g., communication interfaces 312, discussed below). The historical data 112 and/or consumption metric data 114 may be accessed at least in part, e.g., via the communication interfaces 312, from data sources 111, which may include, cloud compute utilization databases, serverless host interfaces, cloud expenditure databases, master serverless cost databases, serverless family/template description data, infrastructure/project tags or other data sources.

After the historical data 112 and/or consumption metric data 114 are obtained and stored, the eligibility layer 110 may access the some or all of the stored data (206) using memory resources passed from the data-staging layer 105 (e.g., memory access resources). The eligibility layer 110 may process the historical data 112 to determine data completeness for a serverless function represented within the historical data (208). For example, the eligibility layer 110 may determine whether the historical data includes data relevant to the serverless function being investigated. In some implementations, a threshold length of data history may be used. For example, eligibility may be granted from serverless functions with more than a predetermined period of historical data (30 day, 90 days, 12 months, multiple years, or other predetermined duration). Relevance of historical data may be determined based on tagging data, serverless function class, ownership, or other indications of relevance. When data completeness is confirmed, the eligibility layer 110 may mark a serverless function as sizing eligible.

At the metric selection layer 120, the SSSL 200 may select an execution duration metric and a compute sizing metric for iterative comparison (210). For example, the metric selection layer 120 may determine the metrics over which to analyze a serverless function. For example, the metrics may include compute resource type, such as memory size or other compute resource type. The metrics may include other factors such as execution duration, request response lag time, non-response ratios, or other metrics.

After selection of the metrics, the SSSL 200 may perform an analysis to determine a base compute size 152 and a compute buffer range 154 (212). The base compute size may include a "base" compute allocation to which a compute buffer may be added. Accordingly, the iterative evaluation process may traverse the compute buffer range varying the compute buffer size while the base compute allocation stays static during the iterative analysis.

In various implementations, the base compute allocation may be determined based on a predicted compute usage by the SSSL 200 at the compute allocation layer. In some cases, the base compute allocation may be selected to be a predetermined percentile (e.g., 95th percentile, 99th percentile, or other pre-determined percentile) of the predicted compute usage for the prediction period. For example, for a memory-type compute resource, the base compute allocation may include a base memory allocation.

The computer buffer range may be selected based on a predetermined percentile (e.g., 95th percentile, 100th percentile (e.g., max usage), or other pre-determined percentile) of the predicted compute usage for the prediction period. For example, the minimum end of the computer buffer range may be selected such that the base compute allocation plus the minimum buffer is equal to the max usage. In some cases, setting the computer buffer range minimum based on the max usage may reduce the chance of serverless duration timeouts (e.g., where the serverless function fails to complete execution prior to an end of the allowed persistence time for the serverless function. As a concrete real-world example, the serverless function may be barred from persisting more than 15 minutes. Accordingly, a timeout may occur if the serverless function fails to complete execution in less than 15 minutes.

In some implementations, the computer buffer range may be reset with an increased minimum and the iterative process described below may be restarted when a timeout is found using the default minimum buffer size. In some cases, the minimum buffer size may be increase by a predetermined amount when a timeout is found through the iterative process. For example, the buffer may be increased 15% or other percentage, a percentage of the base+buffer total, or by another predetermined value. In some cases, the iterative process may stop the current iteration and proceed to the next value.

The compute buffer range maximum may be set to a predetermined value based on the parameters. For example, the maximum buffer may be set such that the base+buffer is equal to some multiple of the maximum predicted usage (e.g., 105%, 110%, 115%, or other multiple).

In various implementations, the SSSL 200 may perform a deep-learning analysis to predict the serverless function usage parameters. In some cases, the deep-learning analysis may include a comparison between the serverless function under test and previously executed serverless functions represented within the historical data 112. The comparison may be implemented by training a deep-learning neural network based on at least a portion of the historical data 112. The training process may adjust the interneural weights for the layers within the deep-learning neural network. Allowing the serverless function under test to be classified (and parameterized) in the context of previously executed serverless functions.

After selection of the compute buffer range and base compute allocation, the SSSL 200 may, the duration mapping layer 160, perform an iterative analysis to traverse values of the compute buffer range (214). In some cases, the iterative process may start at the compute buffer range minimum and proceed toward the maximum. In some cases, a nonlinear search may be used.

For each iteration, the process may selecting a current compute buffer size for the iteration (240). For example, the SSSL 200 may increase the buffer by a set increment from the previous iteration (e.g., 10% of buffer range, 5% of buffer range, defined fraction of buffer range, inverse of selected number of iterations, or other increment). For example, SSSL 200 may perform a differential gradient analysis (e.g., using convergence modeling) to select a dynamic increment. For example, the SSSL 200 may proceed according to a search algorithm. The process may terminate (e.g., reach iteration stop condition) when the iterative process leads to a buffer value above the buffer maximum.

Once the current compute buffer size is selected, the SSSL 200 may determine an execution duration based on the current compute buffer size and the base compute allocation (242).

In various implementations, the SSSL 200 may perform a deep-learning analysis to predict the serverless function execution duration for a given buffer/base combination. In some cases, the deep-learning analysis may include a comparison between the serverless function under test and previously executed serverless functions represented within the historical data 112. The comparison may be implemented by training a deep-learning neural network based on at least a portion of the historical data 112. The training process may adjust the interneural weights for the layers within the deep-learning neural network. Allowing the serverless function under test to be classified (and execution duration determined) in the context of previously executed serverless functions.

Once the duration for the current buffer size is determined, the SSSL 200 may determine a current computational-performance score corresponding to the buffer/base and the duration (244). In some cases, the computational-performance score may include an efficiency-type score, in which the score is assigned favoring shorter execution duration and fewer compute resources. In some cases, the computational-performance score may be based weights determined using the consumption metric data 114. Accordingly, the iterative process may search for the computer buffer size that balances execution duration with compute resource allocation to reduce consumption metrics (e.g., achieve efficiency).

The SSSL 200 may determine whether the computational-performance score and/or current buffer size meeting an iteration stop criterion (246). Iteration stop criteria may include location of a buffer size with a comparatively better computational-performance score to other buffer sizes in the compute buffer size range. For example, when a local extremum (e.g., minimum or maximum depending on computational-performance score type) is reached the iteration stop criterion may be met. In some cases, an iteration stop criterion may be met when the current buffer size is equal (or greater than) the maximum of the compute buffer range. In some cases, the iteration stop criterion may be met when the duration determination indicates that the current buffer size would result in an execution timeout for the serverless function. In some cases, in response to a timeout, the compute buffer range may be reevaluated the iterative analysis may restart with a new compute buffer range with new maximums and/or minimums. In some cases, an execution timeout may not be an iteration stop criterion and the iterative process may continue with a next highest increment or a next step with a buffer size that is larger than the buffer size that produced the timeout.

When the iteration stop criterion is met as a result of an extremum performance score and/or a maximum buffer size being reached, the SSSL 200 may end the iterative traversal (248) and designate that the buffer size meeting the iteration stop criterion as the prescriptive compute buffer size 162 (250).

As an illustrative example, the analysis may be performed for a memory-type compute resource and an iterative process using a set increment. Table 1 shows an example pseudocode routine to implement such an iterative process.

TABLE 1

Example Routine for Iterative Process for Memory-Type Compute Description

| | |
|---|---|
| Example Routine | selected_buffer = None<br>For(i = 0: τ):<br>   buffer_selected = buffer_minimum +<br>   (buffer_maximum * 1/τ * i)<br>   provisioned_memory_new = memory_maximum +<br>   buffer selected<br>   projected_duration= g(provisioned_memory_new)<br>   if (projected_duration < timeout_threshold):<br>      selected_buffer = buffer_selected<br>      exit |

τ: total number of iterations
i: iteration counter (cycles from 0 to τ).

In various implementations, after a prescriptive compute buffer size is found by the iterative process, the SSSL 200 may, at the requisition layer 170 generate a requisition token 172 based on the prescriptive compute buffer size and base compute buffer size (216). The requisition token 172 may be used to control allocations for instances of the serverless function. The requisition token 172 may be sent to a host interface for control of serverless compute resources via the network interface circuitry (218) (e.g., interfaces 312, discussed below).

In various implementations, the SSSL 200 may further base the requisition token 172 on one or more finalization directives (e.g., interface command from operators and/or machine-learning based adjustments). A finalization directive may, for example, include feedback-based machine-learning-trained (e.g., using various machine-learning schemes, deep-learning, neural networks, and/or other machine-learning schemes) adjustments to the prescriptive compute buffer size and/or base compute allocation. The feedback (on which to base the machine-learning training) may include operator commands.

At the presentation layer 180, the SSSL 200 may generate a sizing-command interface 182, which may receive operator commands and present prescriptive compute buffers sizes/allocations for review by operators. The received operator commands may change and/or confirm the selection of the prescriptive compute allocations and/or adjust other settings options.

Figure 3:
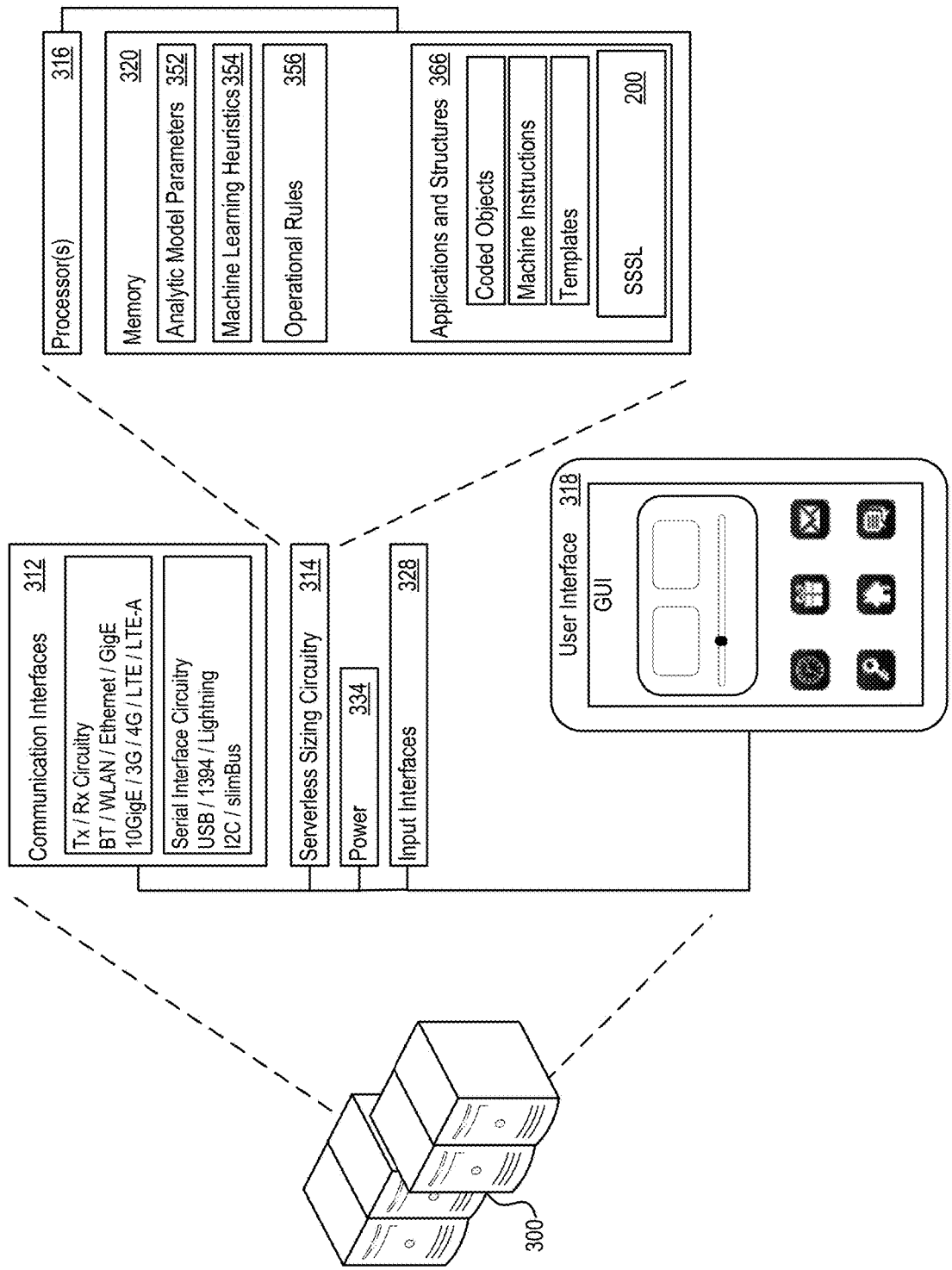
FIG. 3 shows an example specific execution environment for the example serverless sizing stack.

FIG. 3 shows an example specific execution environment 300 for the SSS 100 described above. The execution environment 300 may include serverless sizing circuitry 314 to support execution of the multiple layers of SSS 100 described above. The serverless sizing circuitry 314 may include processors 316, memory 320, and/or other circuitry.

The memory 320 may include analytic model parameters 352, machine learning heuristics 354, and operational rules 356. The memory 320 may further include applications and structures 366, for example, coded objects, machine instructions, templates, or other structures to support historical data analysis, tolerance accommodation, strata selection or other tasks described above. The applications and structures may implement the SSSL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, I²C, slimBus, or other serial interfaces. The communication interfaces 312 may be used to support and/or implement remote operation of the sizing-command interface 182. The execution environment 300 may include power functions 334 and various input interfaces 328. The execution environment may also include a user interface 318 that may include human-to-machine interface devices and/or graphical user interfaces (GUI). The user interface 318 may be used to support and/or implement local operation of the sizing-command interface 182. In various implementations, the serverless sizing circuitry 314 may be distributed over one or more physical servers, be implemented as one or more virtual machines, be implemented in container environments such as Cloud Foundry or Docker, and/or be implemented in Serverless (functions as-a-Service) environments.

In some cases, the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the SSS 100, of the execution environment onto the hardware resources. In some cases, a manifest may be stored as a preference file such as a YAML (yet another mark-up language), JSON, or other preference file type.

Figure 4:
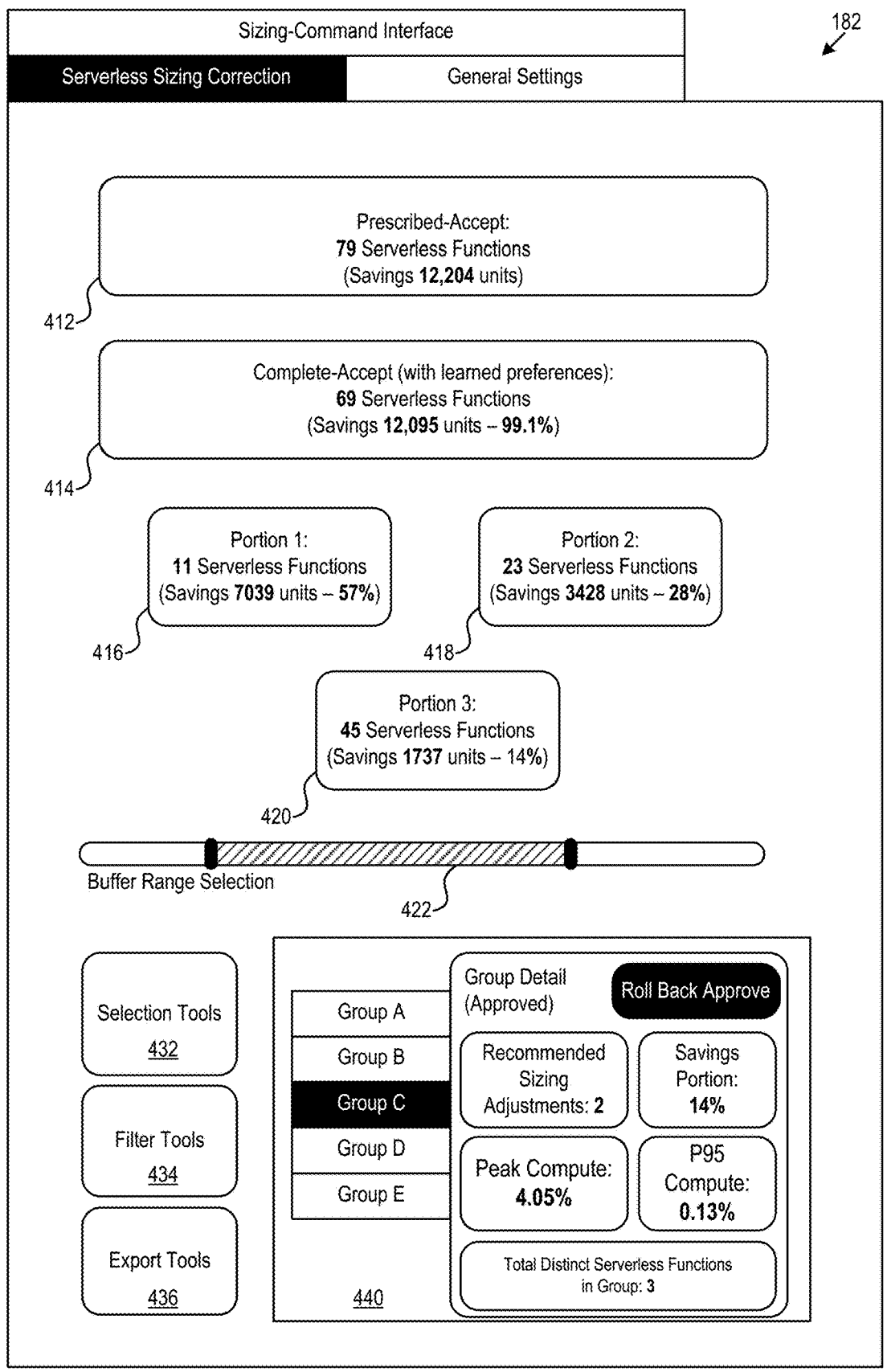
FIG. 4 shows a first example sizing-command interface.

Referring now to FIG. 4, a first example sizing-command interface 182 is shown. The sizing-command interface 182 may include multiple selectable options 412, 414, 416, 418, 420, 422 and data regarding the prescriptive compute buffer size and/or base compute allocation adjustments before and after alteration to accommodate the learned preferences of the operator. The sizing-command interface 182 may also include input parameters for the iterative analysis, such as an option 422 for selecting the computer buffer range. In this example scenario, the selectable options may include a prescribed-accept option 412 to implement some or all of the prescriptive compute buffer sizes and/or base compute allocations (e.g., for multiple parallel analyses) as a group without alteration based on learned preferences, a complete-accept option 414 to implement the prescriptive compute buffer sizes and/or base compute allocations with alterations (finalization directives) based on learned preferences, and options 416, 418, 420 to implement adjustments to selected subsets of the prescriptive compute buffer sizes and/or base compute allocations.

Additionally or alternatively, the sizing-command interface 182 may include selection and filter tools 432, 434 to support granular manipulation of the prescriptive compute buffer sizes and/or base compute allocations, e.g., by resource region, by tolerances accommodated; or other granular manipulation. The sizing-command interface 182 may include data export tools 436 for export of the presented data.

In some implementations, the sizing-command interface 182 may include a group detail panel 440 for management of group-level selectable options such as group level approvals of prescriptive compute buffer sizes and/or base compute allocations. Additionally or alternatively, the group detail panel 440 may display group-level information regarding prescriptive compute buffer sizes and/or base compute allocations of the serverless function. The group detail panel 440 may also provide an option to roll back previously approved prescriptive compute buffer sizes and/or base compute allocations.

In the example, shown in FIG. 4, the options 416, 418, 420 allow for manipulation of selected subsets of the prescriptive compute buffer sizes for serverless functions. For example, as shown the example routine in table two, the tier requisition adjustments may be "binned" into consumption savings groups (e.g., groups based on consumption metric analyses indicating resource savings associated with the prescriptive compute buffer sizes). For example, "high", "medium", and "low" consumption savings bins may allow the operator to select specific groups of serverless function. The options 416, 418, 420 show the respective portions of the total consumption savings that may be achieved by adjusting each specific subset of the serverless function. In the example, the first subset option 416 provides the greatest marginal consumption savings, while the options 418, 420 provide successively smaller marginal consumption savings.

Figure 5:
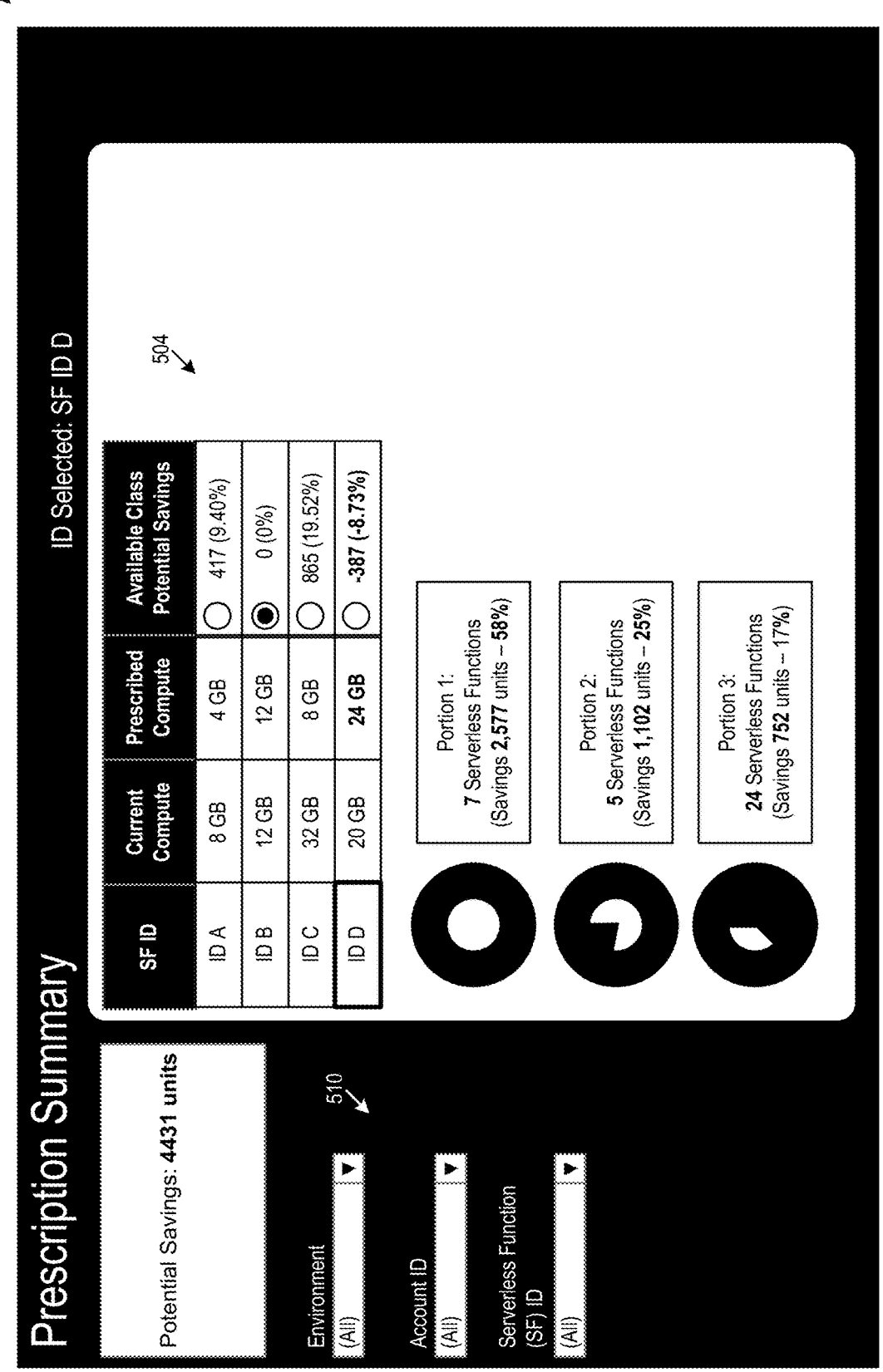
FIG. 5 shows a second example sizing-command interface.

FIG. 5 shows a second example sizing-command interface 500. The second example sizing-command interface 500 is serverless function identifier (e.g., a specific and/or unique designation for a given serverless function) specific. The sizing-command interface 500 provides detail panels 504 with regard to consumption savings for the selected serverless function resource (SF ID). Selections based on operator preferences may be made within the detail panels 504. The sizing-command interface 500 may further include tools 510 for filtering and selecting serverless function identifiers for detail display within the example sizing-command interface 500.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

Various examples are listed in Table 2.

TABLE 2

Examples

1. A system including:
serverless sizing circuitry configured to execute a serverless sizing stack, the
  serverless sizing circuitry configured to:
    at a data-staging layer of the serverless sizing stack, obtain historical data
      including execution duration data and compute usage data for a
      serverless function;

TABLE 2-continued

Examples at an eligibility layer of the serverless sizing stack:
  access the historical data via data-storage operations provided by
    the data-staging layer;
  based on the historical data, determine data completeness for a
    serverless function represented within the historical data; and
  when data completeness for the serverless function exceeds a pre-
    determined threshold, mark the serverless function as sizing-
    eligible;
at a metric selection layer of the serverless sizing stack, select an execution
  duration metric and a compute sizing metric for iterative comparison;
at a compute allocation layer of the serverless sizing stack, determine, via a
  compute deep-learning analysis of the compute usage data, a base
  compute size and compute buffer range;
at a duration mapping layer of the serverless sizing stack, conduct an
  iterative traversal of the compute buffer range by:
    for each iteration:
      selecting a current compute buffer size for the iteration, the
        current compute buffer size being within the compute buffer
        range;
      based on a combination of the base compute size and the
        current compute buffer size and using a duration deep-
        learning analysis of the execution duration data, determining
        a current compute duration for the serverless function;
      based on the current compute duration, the base compute
        size, and the current compute buffer size, determining a
        current computational-performance score for the current
        compute buffer size;
      determining whether the current computational-performance
        score meets an iteration stop criterion; and
      when the current computational-performance score meets the
        iteration stop criterion:
          ending the iterative traversal; and
          designating the current compute buffer size as a
            prescriptive compute buffer size; and
  at a requisition layer of the serverless sizing stack, generate a serverless
    requisition token including:
      a request for the serverless function with a requested size
        corresponding to the prescriptive compute buffer size and base
        compute buffer size; and
network interface circuitry configured to send the serverless requisition token to a
 host interface for control of serverless compute resources.
2. The system of example 1 or any other example in this table, where:
the compute usage data includes memory usage data;
the base compute size includes a base memory allocation; and
the compute buffer range includes a memory buffer range.
3. The system of example 1 or any other example in this table, where:
the compute allocation layer includes a neural network trained using the historical
 data; and
the serverless sizing circuitry is further configured to:
  perform the compute deep-learning analysis of the compute usage data by
    comparing the serverless function to previous functions by applying a
    representation of the serverless function to an input layer of the neural
    network.
4. The system of example 1 or any other example in this table, where the
computational-performance score includes a score generated based on a
product of a sum of the base compute size and the current compute buffer size
multiplied by the current compute duration.
5. The system of example 4 or any other example in this table, where the
serverless sizing circuitry is further configured to:
access consumption metric data for the sum of the base compute size and the
 current compute buffer size; and
generate the computational-performance score by weighting the sum based on the
 consumption metric data for the sum of the base compute size and the current
 compute buffer size.
6. The system of example 1 or any other example in this table, where:
the iteration stop criterion includes a condition that the current compute buffer size
 has reached an end of the compute buffer range.
7. The system of example 1 or any other example in this table, where:
the iteration stop criterion includes a condition that the computational-performance
 score for the current compute buffer size has reached an extremum.
8. The system of example 7 or any other example in this table, where the
 extremum is associated with a consumption metric minimum for one or more
 computational performance scores for the iterative traversal.
9. The system of example 1 or any other example in this table, where the
 serverless sizing circuitry is further configured to determine the compute buffer
 range by:

TABLE 2-continued

Examples determining a maximum predicted compute size used by the serverless function; and
setting a lowest end of the compute buffer range such that the lowest end and the base compute size together equal the maximum predicted compute size.
10. The system of example 1 or any other example in this table, where the serverless sizing circuitry is further configured to determine the base compute size by:
predicting compute size usages over the course of execution of serverless function; and
determining a percentile compute size usage corresponding to a compute size usage at a predetermined percentile among the compute size usages; and
setting the base compute size to accommodate the percentile compute size usage.
11. The system of example 1 or any other example in this table, where the historical data corresponds to at least 12 months of usage data.
12. The system of example 1 or any other example in this table, where the serverless requisition token is generated based on a finalization directive, the finalization directive including:
an operator input command received at a serverless command-interface generated at a presentation layer of the serverless sizing stack;
a feedback-trained machine learning adjustment determined based on an operator input command history; or
both.
13. A method including:
at serverless sizing circuitry configured to execute a serverless sizing stack:
  at a data-staging layer of the serverless sizing stack: obtaining historical data including execution duration data and compute usage data for a serverless function;
  at an eligibility layer of the serverless sizing stack:
    accessing the historical data via data-storage operations provided by the data-staging layer;
    based on the historical data, determining data completeness for a serverless function represented within the historical data; and
    when data completeness for the serverless function exceeds a pre-determined threshold, marking the serverless function as sizing-eligible;
  at a metric selection layer of the serverless sizing stack, selecting an execution duration metric and a compute sizing metric for iterative comparison;
  at a compute allocation layer of the serverless sizing stack, determining, via a compute deep-learning analysis of the compute usage data, a base compute size and compute buffer range;
  at a duration mapping layer of the serverless sizing stack, conducting an iterative traversal of the compute buffer range by:
    for each iteration:
      selecting a current compute buffer size for the iteration, the current compute buffer size being within the compute buffer range;
      based on a combination of the base compute size and the current compute buffer size and using a duration deep-learning analysis of the execution duration data, determining a current compute duration for the serverless function;
      based on the current compute duration, the base compute size, and the current compute buffer size, determining a current computational-performance score for the current compute buffer size;
      determining whether the current computational-performance score meets an iteration stop criterion; and
      when the current computational-performance score meets the iteration stop criterion:
        ending the iterative traversal; and
        designating the current compute buffer size as a prescriptive compute buffer size; and
  at a requisition layer of the serverless sizing stack, generating a serverless requisition token including:
    a request for the serverless function with a requested size corresponding to the prescriptive compute buffer size and base compute buffer size; and
via network interface circuitry, sending the serverless requisition token to a host interface for control of serverless compute resources.
14. The method of example 13 or any other example in this table, where determining the computational-performance score includes generating a score based on a product of a sum of the base compute size and the current compute buffer size multiplied by the current compute duration.

TABLE 2-continued

Examples

15. The method of example 14 or any other example in this table, further
 including:
accessing consumption metric data for the sum of the base compute size and the
 current compute buffer size; and
generating the computational-performance score by weighting the sum based on
 the consumption metric data for the sum of the base compute size and the
 current compute buffer size.
16. The method of example 13 or any other example in this table, where:
the iteration stop criterion includes a condition that the current compute buffer size
 has reached an end of the compute buffer range.
17. The method of example 13 or any other example in this table, where:
the iteration stop criterion includes a condition that the computational-performance
 score for the current compute buffer size has reached an extremum.
18. The method of example 17 or any other example in this table, where the
 extremum is associated with a consumption metric minimum for one or more
 computational performance scores for the iterative traversal.
19. A product including:
machine-readable media other than a transitory signal; and
instructions stored on the machine-readable media, the instructions configured to,
 when executed, cause a machine to:
  at serverless sizing circuitry configured to execute a serverless sizing stack:
    at a data-staging layer of the serverless sizing stack, obtain historical
      data including execution duration data and compute usage data for
      a serverless function;
    at an eligibility layer of the serverless sizing stack:
      access the historical data via data-storage operations
        provided by the data-staging layer;
      based on the historical data, determine data completeness for
        a serverless function represented within the historical data;
        and
      when data completeness for the serverless function exceeds a
        pre-determined threshold, mark the serverless function as
        sizing-eligible;
    at a metric selection layer of the serverless sizing stack, select an
      execution duration metric and a compute sizing metric for iterative
      comparison;
    at a compute allocation layer of the serverless sizing stack,
      determine, via a compute deep-learning analysis of the compute
      usage data, a base compute size and compute buffer range;
    at a duration mapping layer of the serverless sizing stack, conduct an
      iterative traversal of the compute buffer range by:
      for each iteration:
        selecting a current compute buffer size for the iteration,
          the current compute buffer size being within the
          compute buffer range;
        based on a combination of the base compute size and
          the current compute buffer size and using a duration
          deep-learning analysis of the execution duration data,
          determining a current compute duration for the
          serverless function;
        based on the current compute duration, the base
          compute size, and the current compute buffer size,
          determining a current computational-performance
          score for the current compute buffer size;
        determining whether the current computational-
          performance score meets an iteration stop criterion;
          and
        when the current computational-performance score
          meets the iteration stop criterion:
            ending the iterative traversal; and
            designating the current compute buffer size as a
            prescriptive compute buffer size; and
    at a requisition layer of the serverless sizing stack, generate a
      serverless requisition token including:
        a request for the serverless function with a requested size
          corresponding to the prescriptive compute buffer size and
          base compute buffer size; and
  at network interface circuitry, send the serverless requisition token to a host
    interface for control of serverless compute resources.
20. The product of example 19 or any other example in this table, where:
the compute allocation layer includes a neural network trained using the historical
 data; and
the instructions are further configured to cause the machine to:
  perform the compute deep-learning analysis of the compute usage data by
    comparing the serverless function to previous functions by applying a
    representation of the serverless function to an input layer of the neural
    network.

TABLE 2-continued

Examples

21. A method implemented by operation of a system of any of the examples in this table.
22. A product comprising instructions stored on a machine readable medium, the instructions configured to cause a machine to implement the method of example 21.

Various implementations have been specifically described. However, many other implementations are also possible.

What is claimed is:

1. A system including:
serverless sizing circuitry configured to execute a serverless sizing stack, the serverless sizing circuitry configured to:
at a data-staging layer of the serverless sizing stack, obtain historical data including execution duration data and compute usage data for a serverless function;
at an eligibility layer of the serverless sizing stack:
access the historical data via data-storage operations provided by the data-staging layer;
based on the historical data, determine data completeness for a serverless function represented within the historical data; and
when data completeness for the serverless function exceeds a pre-determined threshold, mark the serverless function as sizing-eligible;
at a metric selection layer of the serverless sizing stack, select an execution duration metric and a compute sizing metric for iterative comparison;
at a compute allocation layer of the serverless sizing stack, determine, via a compute deep-learning analysis of the compute usage data, a base compute size and compute buffer range;
at a duration mapping layer of the serverless sizing stack, conduct an iterative traversal of the compute buffer range by:
for each iteration:
selecting a current compute buffer size for the iteration, the current compute buffer size being within the compute buffer range;
based on a combination of the base compute size and the current compute buffer size and using a duration deep-learning analysis of the execution duration data, determining a current compute duration for the serverless function;
based on the current compute duration, the base compute size, and the current compute buffer size, determining a current computational-performance score for the current compute buffer size;
determining whether the current computational-performance score meets an iteration stop criterion; and
when the current computational-performance score meets the iteration stop criterion:
ending the iterative traversal; and
designating the current compute buffer size as a prescriptive compute buffer size; and at a requisition layer of the serverless sizing stack, generate a serverless requisition token including:
a request for the serverless function with a requested size corresponding to the prescriptive compute buffer size and base compute buffer size; and
network interface circuitry configured to send the serverless requisition token to a host interface for control of serverless compute resources.

2. The system of claim 1, where:
the compute usage data includes memory usage data;
the base compute size includes a base memory allocation; and
the compute buffer range includes a memory buffer range.

3. The system of claim 1, where:
the compute allocation layer includes a neural network trained using the historical data; and
the serverless sizing circuitry is further configured to:
perform the compute deep-learning analysis of the compute usage data by comparing the serverless function to previous functions by applying a representation of the serverless function to an input layer of the neural network.

4. The system of claim 1, where the computational-performance score includes a score generated based on a product of a sum of the base compute size and the current compute buffer size multiplied by the current compute duration.

5. The system of claim 4, where the serverless sizing circuitry is further configured to:
access consumption metric data for the sum of the base compute size and the current compute buffer size; and
generate the computational-performance score by weighting the sum based on the consumption metric data for the sum of the base compute size and the current compute buffer size.

6. The system of claim 1, where:
the iteration stop criterion includes a condition that the current compute buffer size has reached an end of the compute buffer range.

7. The system of claim 1, where:
the iteration stop criterion includes a condition that the computational-performance score for the current compute buffer size has reached an extremum.

8. The system of claim 7, where the extremum is associated with a consumption metric minimum for one or more computational performance scores for the iterative traversal.

9. The system of claim 1, where the serverless sizing circuitry is further configured to determine the compute buffer range by:
determining a maximum predicted compute size used by the serverless function; and
setting a lowest end of the compute buffer range such that the lowest end and the base compute size together equal the maximum predicted compute size.

10. The system of claim 1, where the serverless sizing circuitry is further configured to determine the base compute size by:

predicting compute size usages over the course of execution of serverless function; and
determining a percentile compute size usage corresponding to a compute size usage at a predetermined percentile among the compute size usages; and
setting the base compute size to accommodate the percentile compute size usage.

11. The system of claim 1, where the historical data corresponds to at least 12 months of usage data.

12. The system of claim 1, where the serverless requisition token is generated based on a finalization directive, the finalization directive including:
an operator input command received at a serverless command-interface generated at a presentation layer of the serverless sizing stack;
a feedback-trained machine learning adjustment determined based on an operator input command history; or both.

13. A method including:
at serverless sizing circuitry configured to execute a serverless sizing stack:
at a data-staging layer of the serverless sizing stack:
obtaining historical data including execution duration data and compute usage data for a serverless function;
at an eligibility layer of the serverless sizing stack:
accessing the historical data via data-storage operations provided by the data-staging layer;
based on the historical data, determining data completeness for a serverless function represented within the historical data; and
when data completeness for the serverless function exceeds a pre-determined threshold, marking the serverless function as sizing-eligible;
at a metric selection layer of the serverless sizing stack, selecting an execution duration metric and a compute sizing metric for iterative comparison;
at a compute allocation layer of the serverless sizing stack, determining, via a compute deep-learning analysis of the compute usage data, a base compute size and compute buffer range;
at a duration mapping layer of the serverless sizing stack, conducting an iterative traversal of the compute buffer range by:
for each iteration:
selecting a current compute buffer size for the iteration, the current compute buffer size being within the compute buffer range;
based on a combination of the base compute size and the current compute buffer size and using a duration deep-learning analysis of the execution duration data, determining a current compute duration for the serverless function;
based on the current compute duration, the base compute size, and the current compute buffer size, determining a current computational-performance score for the current compute buffer size;
determining whether the current computational-performance score meets an iteration stop criterion; and
when the current computational-performance score meets the iteration stop criterion:
ending the iterative traversal; and
designating the current compute buffer size as a prescriptive compute buffer size; and
at a requisition layer of the serverless sizing stack, generating a serverless requisition token including:
a request for the serverless function with a requested size corresponding to the prescriptive compute buffer size and base compute buffer size; and
via network interface circuitry, sending the serverless requisition token to a host interface for control of serverless compute resources.

14. The method of claim 13, where determining the computational-performance score includes generating a score based on a product of a sum of the base compute size and the current compute buffer size multiplied by the current compute duration.

15. The method of claim 14, further including:
accessing consumption metric data for the sum of the base compute size and the current compute buffer size; and
generating the computational-performance score by weighting the sum based on the consumption metric data for the sum of the base compute size and the current compute buffer size.

16. The method of claim 13, where:
the iteration stop criterion includes a condition that the current compute buffer size has reached an end of the compute buffer range.

17. The method of claim 13, where:
the iteration stop criterion includes a condition that the computational-performance score for the current compute buffer size has reached an extremum.

18. The method of claim 17, where the extremum is associated with a consumption metric minimum for one or more computational performance scores for the iterative traversal.

19. A product including:
non-transitory machine-readable media; and
instructions stored on the machine-readable media, the instructions configured to, when executed, cause a machine to:
at serverless sizing circuitry configured to execute a serverless sizing stack:
at a data-staging layer of the serverless sizing stack, obtain historical data including execution duration data and compute usage data for a serverless function;
at an eligibility layer of the serverless sizing stack:
access the historical data via data-storage operations provided by the data-staging layer;
based on the historical data, determine data completeness for a serverless function represented within the historical data; and
when data completeness for the serverless function exceeds a pre-determined threshold, mark the serverless function as sizing-eligible;
at a metric selection layer of the serverless sizing stack, select an execution duration metric and a compute sizing metric for iterative comparison;
at a compute allocation layer of the serverless sizing stack, determine, via a compute deep-learning analysis of the compute usage data, a base compute size and compute buffer range;
at a duration mapping layer of the serverless sizing stack, conduct an iterative traversal of the compute buffer range by:
for each iteration:
selecting a current compute buffer size for the iteration, the current compute buffer size being within the compute buffer range;

based on a combination of the base compute size and the current compute buffer size and using a duration deep-learning analysis of the execution duration data, determining a current compute duration for the serverless function;

based on the current compute duration, the base compute size, and the current compute buffer size, determining a current computational-performance score for the current compute buffer size;

determining whether the current computational-performance score meets an iteration stop criterion; and when the current computational-performance score meets the iteration stop criterion:
ending the iterative traversal; and
designating the current compute buffer size as a prescriptive compute buffer size; and at a requisition layer of the serverless sizing stack, generate a serverless requisition token including:

a request for the serverless function with a requested size corresponding to the prescriptive compute buffer size and base compute buffer size; and at network interface circuitry, send the serverless requisition token to a host interface for control of serverless compute resources.

20. The product of claim 19, where:

the compute allocation layer includes a neural network trained using the historical data; and the instructions are further configured to cause the machine to:

perform the compute deep-learning analysis of the compute usage data by comparing the serverless function to previous functions by applying a representation of the serverless function to an input layer of the neural network.

* * * * *